US010735510B2

(12) United States Patent
Borlick et al.

(10) Patent No.: US 10,735,510 B2
(45) Date of Patent: *Aug. 4, 2020

(54) STORAGE AND APPLICATION CONTROLLER FOR MIRRORING AND SWITCHOVER OF APPLICATIONS IN A PLURALITY OF CLOUD LOCATIONS VIA A PLURALITY OF CONFIGURABLE SECURITY PROTOCOLS

(71) Applicant: International Business Machines Corporation, Armonk, NY (US)

(72) Inventors: Matthew G. Borlick, Tucson, AZ (US); Lokesh M. Gupta, Tucson, AZ (US); Roger G. Hathorn, Tucson, AZ (US); Karl A. Nielsen, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 5 days.

This patent is subject to a terminal disclaimer.

(21) Appl. No.: 16/041,384

(22) Filed: Jul. 20, 2018

(65) Prior Publication Data
US 2018/0332111 A1 Nov. 15, 2018

Related U.S. Application Data

(63) Continuation of application No. 15/131,898, filed on Apr. 18, 2016, now Pat. No. 10,069,910.

(51) Int. Cl.
*G06F 15/16* (2006.01)
*H04L 29/08* (2006.01)
*H04L 12/46* (2006.01)

(52) U.S. Cl.
CPC ...... *H04L 67/1095* (2013.01); *H04L 12/4641* (2013.01); *H04L 67/1097* (2013.01)

(58) Field of Classification Search
CPC ............. H04L 67/1095; H04L 12/4641; H04L 67/1097
See application file for complete search history.

(56) References Cited

U.S. PATENT DOCUMENTS 7,370,330 B2 * 5/2008 Takahashi ............. G06F 9/4843
715/750
8,719,804 B2 5/2014 Jain
(Continued)

OTHER PUBLICATIONS

A. Westphal, et al., "IBM System Storage DS8000 Architecture and Implementation", IBM Corporation, Document No. SG24-8886-02, Nov. 2012, pp. 534.
(Continued)

*Primary Examiner* — Moustafa M Meky
(74) *Attorney, Agent, or Firm* — Rabindranath Dutta; Konrad Raynes Davda & Victor

(57) ABSTRACT

A storage and application controller that is coupled to a plurality of storage and application execution clouds is maintained. The storage and application controller transmits, via a first communications protocol, an application to a first storage and application execution cloud. The storage and application controller transmits, via a second communications protocol, a copy of the application to a second storage and application execution cloud. In response to a compromise of the first communications protocol, execution of the application is stopped and replaced via execution of the copy of the application.

20 Claims, 10 Drawing Sheets

(56) References Cited

U.S. PATENT DOCUMENTS

| | | | |
|---|---|---|---|
| 8,868,858 B2 | 10/2014 | Atluri | |
| 9,436,556 B2 * | 9/2016 | Siden | G06F 11/1448 |
| 9,602,877 B2 * | 3/2017 | Oh | H04N 21/8173 |
| 10,069,910 B2 * | 9/2018 | Borlick | H04L 67/1095 |
| 2005/0059379 A1 | 3/2005 | Sovio et al. | |
| 2005/0268298 A1 * | 12/2005 | Hunt | G06F 9/4856 |
| | | | 718/1 |
| 2011/0276951 A1 | 11/2011 | Jain | |
| 2013/0254125 A1 | 9/2013 | Sanders | |
| 2014/0359729 A1 | 12/2014 | Kreiner et al. | |
| 2015/0296262 A1 * | 10/2015 | Oh | H04N 21/8173 |
| | | | 725/38 |
| 2016/0269429 A1 | 9/2016 | Martini et al. | |
| 2017/0163731 A1 | 6/2017 | Borlick et al. | |
| 2017/0163772 A1 | 6/2017 | Borlick et al. | |
| 2017/0279812 A1 | 9/2017 | Borlick et al. | |
| 2017/0279890 A1 | 9/2017 | Borlick et al. | |
| 2017/0302507 A1 | 10/2017 | Borlick et al. | |
| 2017/0302678 A1 | 10/2017 | Borlick et al. | |
| 2017/0302733 A1 | 10/2017 | Borlick et al. | |

OTHER PUBLICATIONS

U.S. Appl. No. 14/961,166, filed Dec. 7, 2015.
U.S. Appl. No. 14/961,247, filed Dec. 7, 2015.
U.S. Appl. No. 14/961,208, filed Dec. 7, 2015.
U.S. Appl. No. 15/078,185, filed Mar. 23, 2016.
U.S. Appl. No. 15/130,469, filed Apr. 15, 2016.
U.S. Appl. No. 15/078,187, filed Mar. 23, 2016.
U.S. Appl. No. 15/130,481, filed Apr. 15, 2016.
U.S. Appl. No. 15/131,898, filed Apr. 18, 2016.
Notice of Allowance dated Apr. 27, 2018, pp. 12, for U.S. Appl. No. 15/131,898.
List of IBM Patents or Patent Applications Treated as Related, dated Jul. 20, 2018, pp. 2.

* cited by examiner

STORAGE AND APPLICATION CONTROLLER FOR MIRRORING AND SWITCHOVER OF APPLICATIONS IN A PLURALITY OF CLOUD LOCATIONS VIA A PLURALITY OF CONFIGURABLE SECURITY PROTOCOLS

CROSS-REFERENCE TO RELATED APPLICATION

This application is a continuation of U.S. patent application Ser. No. 15/131,898, filed Apr. 18, 2016, which application is incorporated herein by reference in its entirety.

BACKGROUND

1. Field

Embodiments relate to a storage and application controller for mirroring and switchover of applications in a plurality of cloud locations via a plurality of configurable security protocols.

2. Background

Cloud storage is a model of data storage in which digital data is stored in logical pools, and the physical storage spans a plurality of servers. The physical storage environment may be owned and managed by a hosting company. These cloud storage providers may be responsible for keeping the data available and accessible, and for keeping the physical environment protected and maintained properly. People and organizations may buy or lease storage capacity from the cloud storage providers to store user, organization, or application data.

In certain storage system environments a storage controller that is also referred to as a controller may comprise a plurality of storage servers that are coupled to each other, where one or more of the storage servers may comprise a plurality of processing nodes or servers. The storage controller allows host computing systems to perform input/output (I/O) operations with storage devices controlled by the storage controller. Further details of a storage controller may be found in the publication "IBM System Storage DS8000: Architecture and Implementation," Third Edition, published November 2012, by International Business Machines Corporation.

Network security is a branch of computer security specifically related to networks, and may involve browser security, security of data in transmission, security of other applications in the networked environment, security of the operating systems of computers in the networked environment, etc. Computer communications represents an insecure channel for exchanging information leading to a high risk of intrusion or fraud, such as via the interception and decryption of communications. Different mechanisms have been used to protect the transfer of data via various communications protocols that may include encryption and/or other operations to securely establish connections and transfer data. For example a Secure Sockets Layer (SSL) protocol may be used for connections between two computational devices. A Virtual Private Network (VPN) protocol may be used to link two computational devices such that they appear to be in a local private network. A VPN tunnel may be used to securely communicate between the two computational devices. Internet Protocol Security (IPsec) is a set of protocols that run over the Internet Protocol (IP) layer. IPSec allows two or more computational devices to communicate in a secure manner by authenticating and encrypting each IP packet of a communication session. A VPN established over IPSec is referred to as an IPSec VPN. OpenVPN is an open-source software application that provides virtual VPN techniques for creating secure point-to-point or site-to-site connections in routed or bridged configurations and remote access facilities. Internet direct connect is another mechanism for secure data communications. Various other communications protocols may be used for secure data communications.

SUMMARY OF THE PREFERRED EMBODIMENTS

Provided are a method, a system, and a computer program product in which a storage and application controller that is coupled to a plurality of storage and application execution clouds is maintained. The storage and application controller transmits, via a first communications protocol, an application to a first storage and application execution cloud. The storage and application controller transmits, via a second communications protocol, a copy of the application to a second storage and application execution cloud. In response to a compromise of the first communications protocol, execution of the application is stopped and replaced via execution of the copy of the application.

In additional embodiments, the first storage and application execution cloud is maintained by a first entity, and the second storage and application execution cloud is maintained by a second entity. In response to a failure in execution of the application in the first storage and application execution cloud, results are returned to a host by executing the copy of the application in the second storage and application execution cloud.

In yet additional embodiments, the first communications protocol is changed to a different communications protocol after an elapse of a first predetermined amount of time, to transmit additional applications from the storage and application controller to the first storage and application execution cloud.

In further embodiments, the second communications protocol is changed to a different communications protocol after an elapse of a second predetermined amount of time, to transmit copies of the additional applications from the storage and application controller to the second storage and application execution cloud.

In additional embodiments, in response to a compromise of the first or the second communications protocol, changing the compromised first or the second communications protocol to another communications protocol that is not compromised.

In certain embodiments, the determining of which application to transmit and execute in which of the plurality of storage and application clouds is based on a plurality of factors including security features provided by the plurality of storage and application execution clouds, speed of access provided by the plurality of storage and application execution clouds, and communications protocols for communication with the plurality of storage and application execution clouds.

In further embodiments, the storage and application controller is a dual server based controller that is coupled to a plurality of hosts, wherein the first storage and application execution cloud is separated at least by 10 kilometers from the second storage and application execution cloud. The first communications protocol comprises a Virtual Private Network (VPN) tunnel, wherein the second communications protocol comprises an Internet direct connect, and wherein the first communications protocol is changed from the VPN tunnel to a Secure Sockets Layer (SSL) protocol, subsequent to an expiry of a period of time.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

In certain embodiments, applications are mirrored in different clouds where the different clouds use different security protocols for communicating with the controller. In case of a breach of a security protocol, the controller switches over to using a mirrored application that does not use the breached security protocol. In certain embodiments to guard against potential breaches of one or more security protocols, the security protocols used for communication with the different clouds may be dynamically changed over time for the applications.

Exemplary Embodiments

Figure 1:
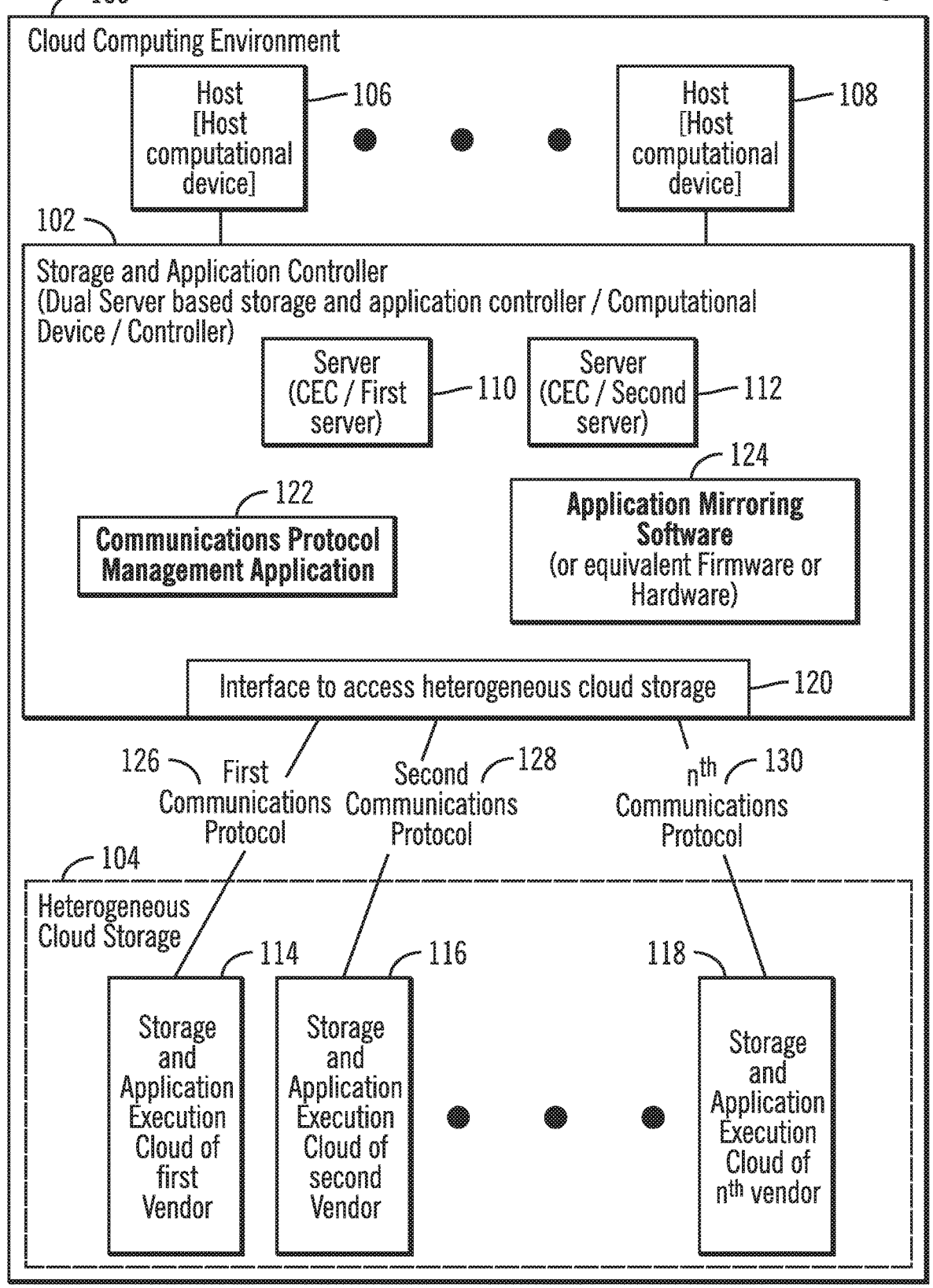
FIG. 1 illustrates a block diagram of a cloud computing environment comprising a dual server based storage and application controller coupled to a heterogeneous cloud comprising a plurality of storage and application execution clouds distributed over a plurality of geographical locations, in accordance with certain embodiments.

FIG. 1 illustrates a block diagram of a cloud computing environment 100 comprising a storage and application controller 102 coupled to a heterogeneous cloud 104 comprising storage and application execution clouds distributed over a plurality of geographical locations, in accordance with certain embodiments. The storage and application controller 102 allows a plurality of hosts 106, 108 (e.g., host computational devices) to perform input/output (I/O) operations with logical storage maintained by the storage and application controller 102. The physical storage corresponding to the logical storage may be found in at least the heterogeneous cloud 104.

The storage and application controller 102 comprises a plurality of server computational devices 110, 112. The server computational devices 110, 112 may also be referred to as servers or central electronic complexes (CEC) or processor complexes. The storage and application controller 102 may comprise a set of hardware that includes central processing units (CPU), memory, channels, controllers, and other elements. The storage and application controller 102 may be referred to as a dual server based storage and application controller because of the presence of the servers 110, 112 in the storage and application controller 102. The servers 110, 112 of the storage and application controller 102, and the hosts 106, 108 may comprise any suitable computational device including those presently known in the art, such as, a personal computer, a workstation, a server, a mainframe, a hand held computer, a palm top computer, a telephony device, a network appliance, a blade computer, a processing device, etc. The servers 110, 112, the storage and application controller 102, and the hosts 106, 108 may be elements in any suitable network, such as, a storage area network, a wide area network, the Internet, an intranet. In certain embodiments, the servers 110, 112 may function redundantly and one server may be able to take over the operations of the other server including performing execution of applications and/or control of storage. In certain embodiments, the servers 110, 112 of the storage and application controller 102, the hosts 106, 108, and the heterogeneous cloud 104 may be elements in the cloud computing environment 100 that comprises a computing environment. In certain embodiments, the storage and application controller 102 may have just one storage server and may not be in a dual server configuration.

The heterogeneous cloud 104 may be comprised of a plurality of storage and application execution clouds 114, 116, 118 where each of the plurality of storage and application execution clouds may be provided and maintained by a different entity, and where each of the plurality of storage and application execution clouds may be maintained in different geographical locations. For example, a first vendor may provide the storage and application execution cloud 114, a second vendor may provide the storage and application execution cloud 116, and a third vendor may provide the storage and application execution cloud 118. The different storage and application execution clouds 114, 116, 118 may be placed at different geographical locations separated by a considerable distance, such as at least 10 kilometers, or for that matter in different countries or continents.

Each storage and application execution cloud 114, 116, 118 may be comprised of a plurality of storage devices, such as storage disks, tape drives, solid state storage, etc., that are maintained by a storage server (referred to as a cloud server) that has an operating system. In certain embodiments, the storage and application execution cloud 114 maintained by the first vendor may be in a first geographical location and may have one operating system, whereas the storage and application execution cloud 116 maintained by the second vendor may be in a second geographical location and may have another operating system. Each of the storage and application execution clouds 114, 116, 118 may be able to execute applications stored in them by the storage and application controller 102. The presence of the heterogeneous cloud 104 allows the storage and application controller 102 to offload execution of applications from the server 110, 112 to the heterogeneous cloud 104.

The storage and application controller 102 may have an interface 120 to access the heterogeneous cloud 104. A communications protocol management application 122 that executes in the storage and application controller 102 provides mechanisms for the storage and application controller 102 to communicate via different communications protocol to different storage and application execution clouds 114, 116, 118 of the heterogeneous cloud 104. For example, the communication protocol management application 122 may use first, second, and $n^{th}$ communications protocols 126, 128, 130 to communicate with the storage clouds 114, 116, 118 respectively, where the first, second and $n^{th}$ communications protocol 126, 128, 130 may be different from each other and may include communications protocols such as a Virtual Private Network (VPN) tunnel, Internet direct connect, Secure Sockets Layer (SSL), etc.

Additionally, an application mirroring software 124 executes in the storage and application controller 102. The application mirroring software 124 distributes an application and a copy of the application in different storage and application execution clouds 114, 116, 118. The communications protocol management application 122 may be implemented in software, firmware, or hardware, or any combination thereof, in accordance with certain embodiments. The application mirroring software 124 may be substituted by firmware or hardware, or any combinations of software, firmware, and/or hardware that perform equivalent functions.

Figure 2:
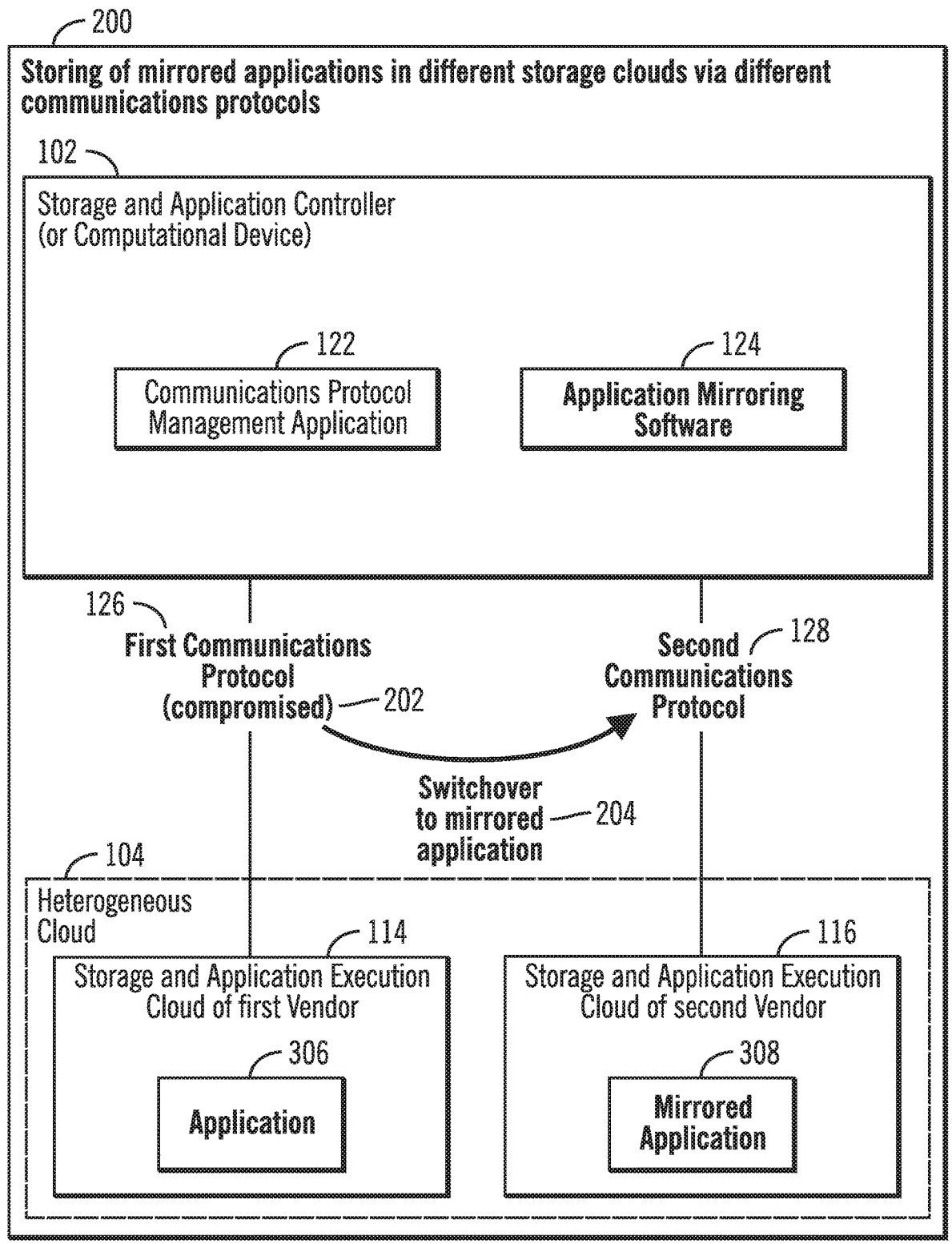
FIG. 2 illustrates a block diagram that shows storing of mirrored applications in different storage and application execution clouds via different communications protocols and switchover of application execution, in accordance with certain embodiments.

FIG. 2 illustrates a block diagram 200 that shows storing of mirrored applications in different storage and application execution clouds via different communications protocols and switchover of application execution. In FIG. 2, the storage and application controller 102 communicates with the storage and application execution cloud 114 via the first communications protocol 126 to transfer the application 306. The storage and application controller 102 also communicates with the storage and application execution cloud 116 via the second communications protocol 128 to transfer a copy of the application 306 to the storage and application evaluation cloud 116, where the copy of the application 306 stored for execution in the storage and application execution cloud 116 is referred to as a mirrored application 308

Many security issues may be associated with the communication between the storage and application controller 102 and the heterogeneous cloud 104. For example, a communications protocol may be compromised via a security flaw leading to a loss of sensitive information during transmission of data. Additionally, if a cloud storage is compromised, then data stored in a storage and application execution cloud may be stolen. For example, if there is an exploitable security flaw in the SSL protocol, passwords may be stolen during transmission of the passwords over a communications link to a storage and application execution cloud.

Certain embodiments ensure security for applications by providing storage and application execution clouds from different vendors and by communicating to the different storage and application execution clouds via different communications protocols.

In certain embodiments, in response to a compromise (e.g., a security breach) of the first communications protocol 126 (the compromise is shown via a reference numeral 202), execution of the application 306 is stopped and replaced via execution of the mirrored application 308 (as shown by the "switchover to mirrored application" 204 indication shown in FIG. 2) that is communicated to via the second communications protocol 128.

Figure 3:
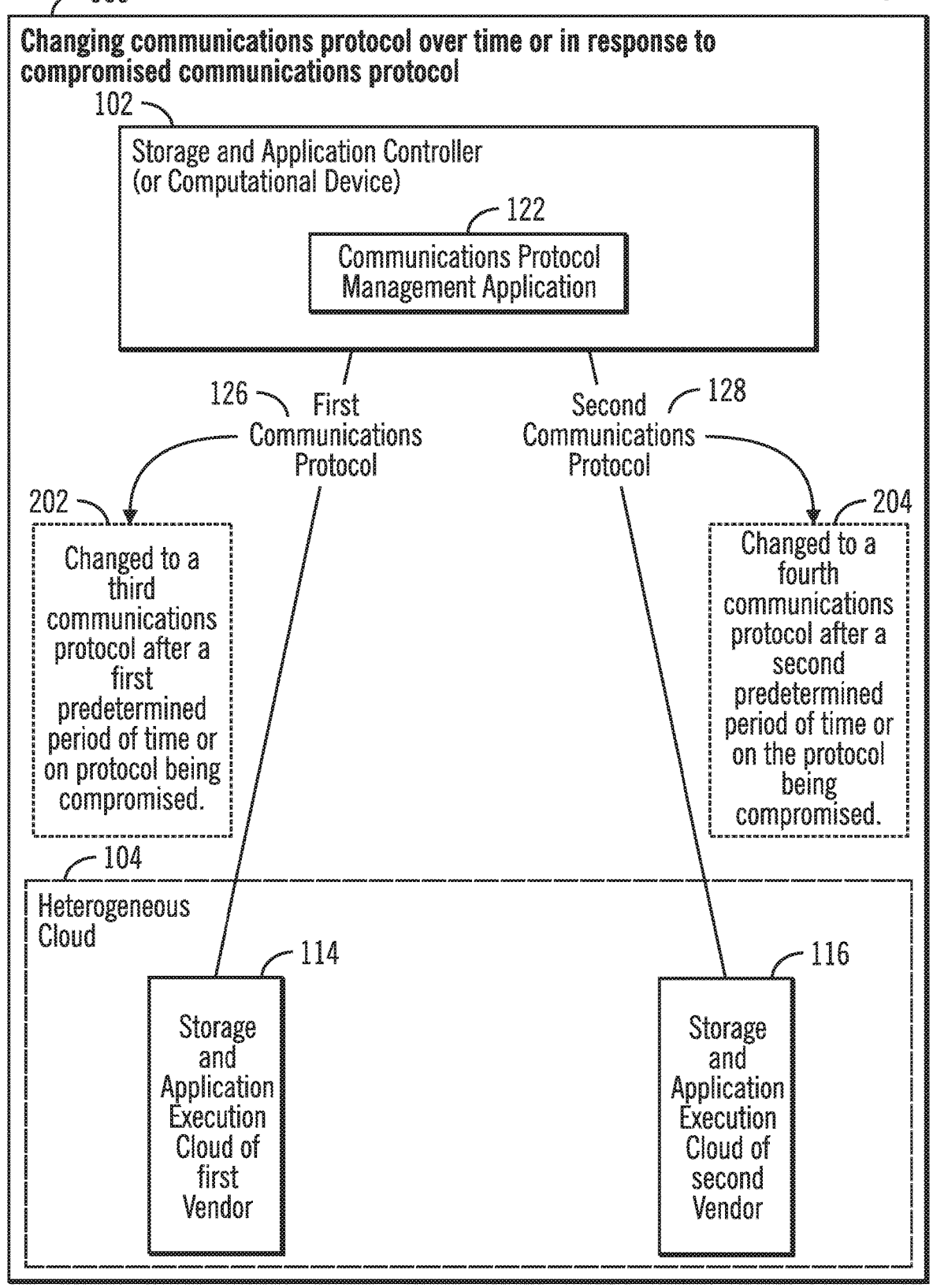
FIG. 3 illustrates a block diagram that shows the changing of communications protocol over time and/or in response to a compromised communications protocol, in accordance with certain embodiments.

FIG. 3 illustrates a block diagram 300 that shows the changing of communications protocol over time and/or in response to a compromised communications protocol, in accordance with certain embodiments.

In certain embodiments shown via reference numeral 202, the storage and application controller 102 changes the first communications protocol 126 to a different communications protocol after an elapse of a first predetermined amount of time, to transmit additional applications from the storage and application controller 102 to the storage and application execution cloud 114. The first communications protocol 126 may also be changed in response to a compromise of the first communications protocol 126.

In certain embodiments shown via reference numeral 204, the storage and application controller 102 changes the second communications protocol 128 to another communications protocol after an elapse of a second predetermined amount of time, to transmit copies of the additional applications to the storage and application execution cloud 116. The second communications protocol 128 may also be changed in response to a compromise of the second communications protocol 128.

Therefore, FIG. 3 shows that communications protocols may be changed over time for communications to different storage and application execution clouds. In response to a compromise of a communications protocol, the communications protocol management application 122 may change the compromised communications protocol to another communications protocol that is not compromised to prevent applications and the data of applications being compromised. In certain embodiments, the first communications protocol 126 comprises a Virtual Private Network (VPN) tunnel, wherein the second communications protocol 128 comprises an Internet direct connect, and wherein the first communications protocol 126 is changed from the VPN tunnel to a Secure Sockets Layer (SSL) protocol, subsequent to an expiry of a period of time.

Figure 4:
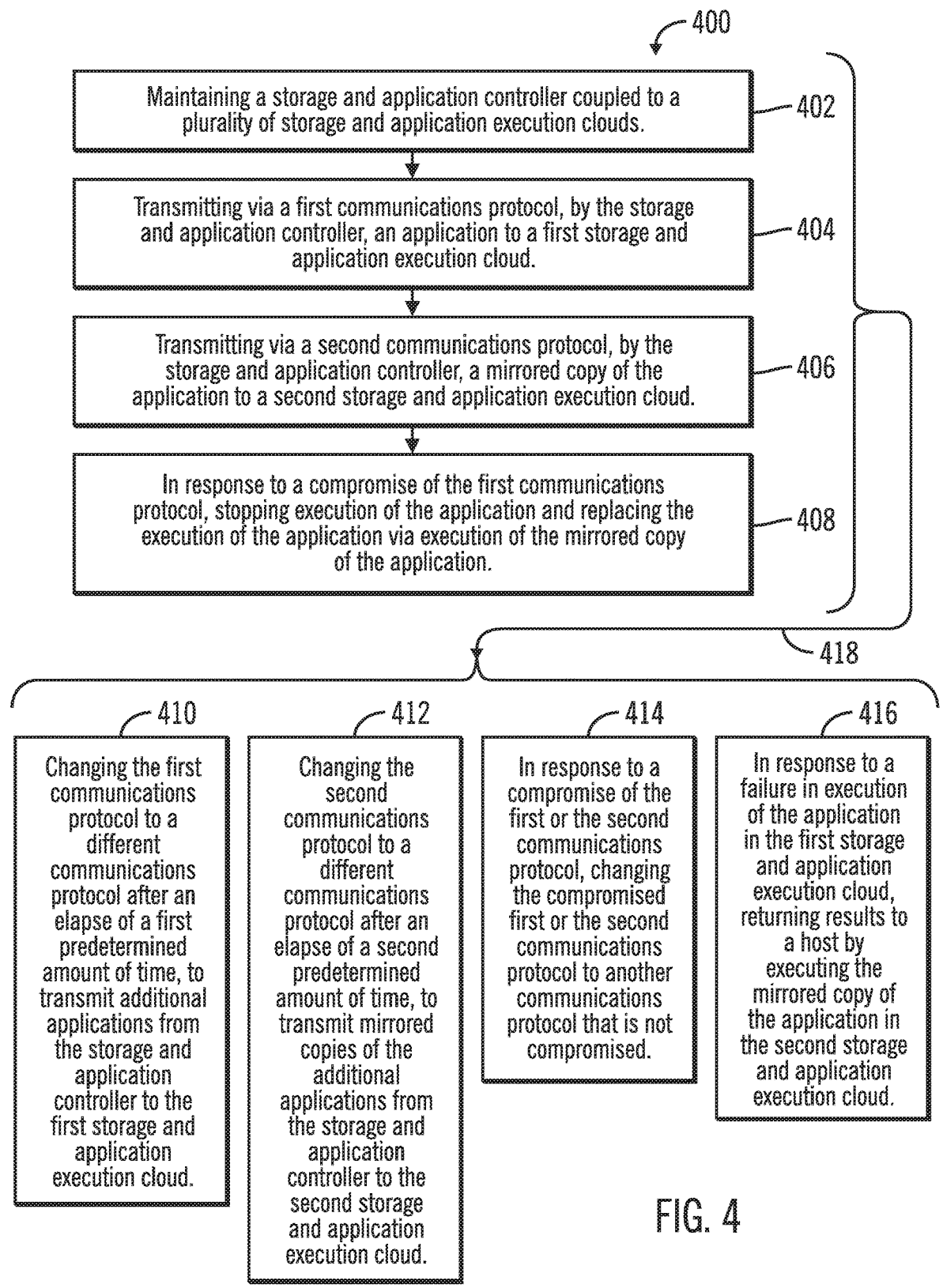
FIG. 4 illustrates a flowchart that shows operations for mirroring applications in a plurality of cloud locations via a plurality of configurable security protocols and switchover to mirrored applications, in accordance with certain embodiments.

FIG. 4 illustrates a flowchart 400 that shows operations for mirroring applications in a plurality of cloud locations via a plurality of configurable security protocols and switchover to mirrored applications, in accordance with certain embodiments Control starts at block 402 in which a storage and application controller 102 that is coupled to a plurality of storage and application execution clouds 114, 116, 118 is maintained. The storage and application controller 102 transmits (at block 404), via a first communications protocol 126, an application to a first storage and application execution cloud 114. The storage and application controller 102 transmits (at block 406), via a second communications protocol 128, a copy of the application (referred to as mirrored application 308) to a second storage and application execution cloud 116.

From block 406 control proceeds to block 408 in which in response to a compromise of the first communications protocol 126, execution of the application 306 in storage and application execution cloud 114 is stopped and replaced via execution of the mirrored application 308 in the storage and application execution cloud 116.

In additional embodiments, the first storage and application execution cloud is maintained by a first entity, and the second storage and application execution cloud is maintained by a second entity. In response to a failure in execution of the application in the first storage and application execution cloud, results are returned to a host by executing the copy of the application in the second storage and application execution cloud.

During the execution of one or more of the operations shown via reference numerals 402, 406, 408, 408 control may proceed to any of the blocks 410, 412, 414, 416 as shown via reference numeral 418.

At block 410, the first communications protocol 126 is changed to a different communications protocol after an elapse of a first predetermined amount of time, to transmit additional applications from the storage and application controller 102 to the first storage and application execution cloud 114.

At block 412, the second communications protocol 128 is changed to a different communications protocol after an elapse of a second predetermined amount of time, to transmit copies of the additional applications from the storage and application controller 102 to the second storage and application execution cloud 116.

In additional embodiments, at block 414, in response to a compromise of the first or the second communications protocol, the compromised first or the second communications protocol is changed to another communications protocol that is not compromised.

At block 416, in response to a failure in execution of an application 306 in the first storage and application execution cloud 114, results are returned to a host 106, 108 by executing the mirrored application 308 in the second storage and application execution cloud 116. Thus the mirrored application 308 is able to substitute the application 306.

Figure 5:
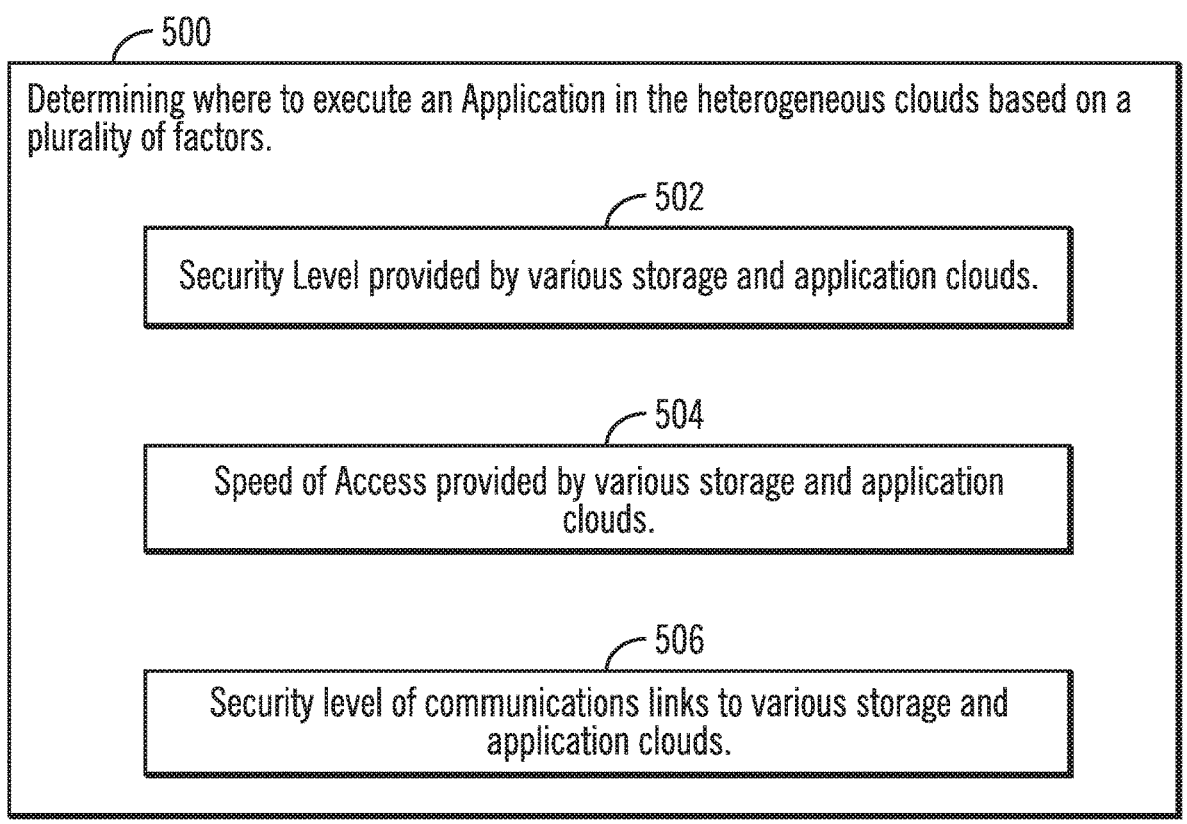
FIG. 5 illustrates a flowchart that shows where to execute an application in the heterogeneous cloud based on a plurality of factors, in accordance with certain embodiments.

FIG. 5 illustrates a block diagram 500 that shows where to execute an application in the heterogeneous cloud 104 based on a plurality of factors, in accordance with certain embodiments.

In FIG. 5, determining which application to transmit and execute in which of the plurality of storage and application clouds is based on a plurality of factors including security features provided by the plurality of storage and application execution clouds (shown via reference numeral 502), speed of access provided by the plurality of storage and application execution clouds (shown via reference numeral 504), and communications protocols for communication with the plurality of storage and application execution clouds (shown via reference numeral 506).

Figure 6:
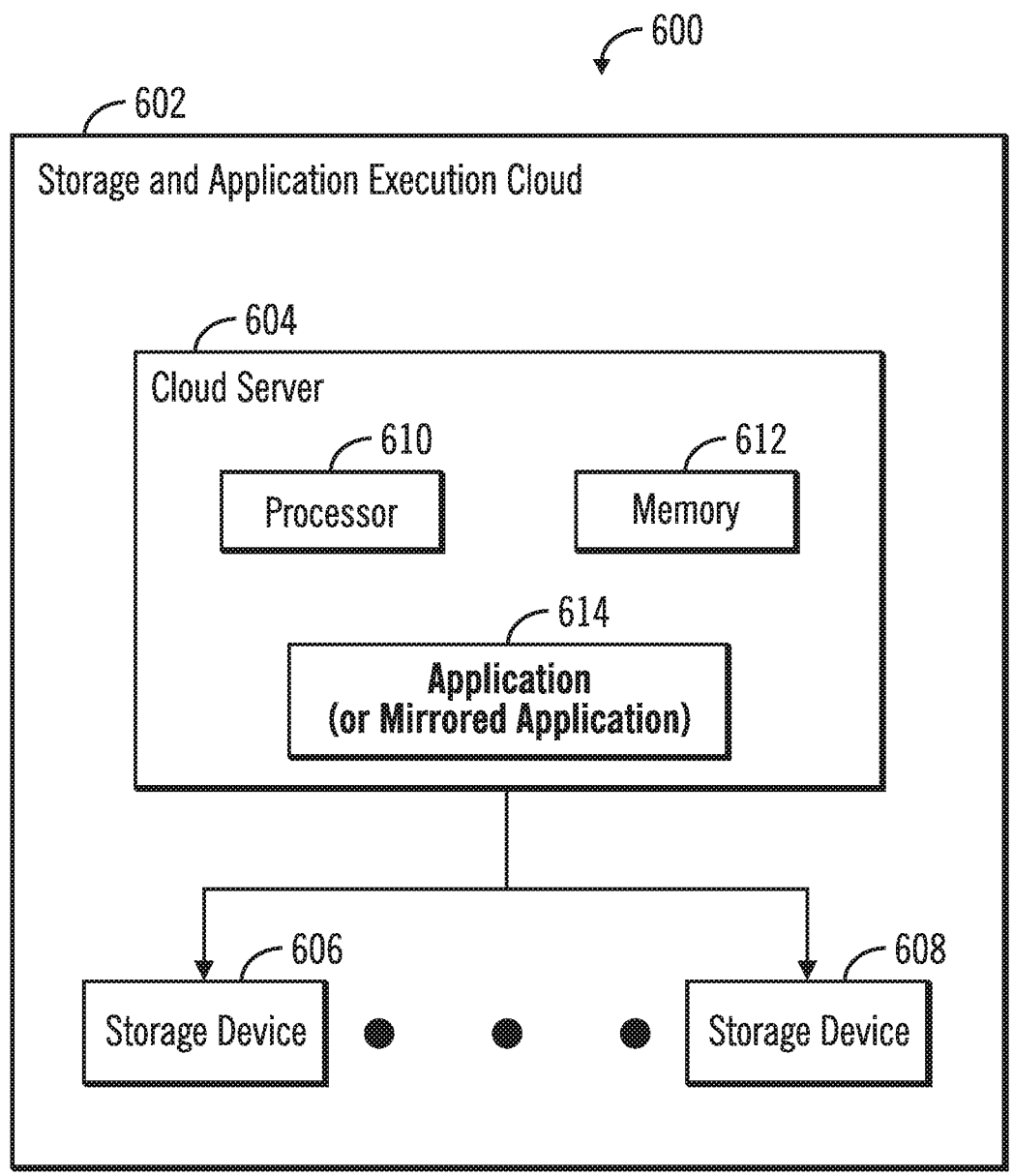
FIG. 6 illustrates a block diagram that shows a storage and application execution cloud comprised of a cloud server having a memory and a processor, and a plurality of storage devices coupled to the cloud server, in accordance with certain embodiments.

FIG. 6 illustrates a block diagram 600 that shows a storage and application execution cloud 602 comprised of a cloud server 604 and a plurality of storage devices 606, 608 coupled to the cloud server 604, in accordance with certain embodiments. The cloud server 604 includes a processor 610, a memory 612, and executes the application 614 (or executes the mirrored application). The cloud server 604 may comprise any suitable computational device including those presently known in the art, such as, a personal computer, a workstation, a server, a mainframe, a hand held computer, a palm top computer, a telephony device, a network appliance, a blade computer, a processing device, etc. The storage devices 606, 608 may comprise any suitable storage device comprising a disk drive, a tape drive, an optical drive, a solid state drive, etc. The storage and application execution cloud 602 may correspond to any of the storage and application execution clouds 114, 116, 118 shown in FIG. 1, or other storage and application execution clouds shown in FIGS. 2-5.

Therefore, FIGS. 1-6 illustrate certain embodiments in which a storage and application controller 102 distributes applications and copies of applications in a plurality of storage and application execution clouds 114, 116, 118. Different communication protocols are used to communicate with an application and a copy of the application. In case a communication protocol for communication with an application is compromised, a switchover is made by the storage and application controller 102 to the copy of the application.

Dual Server Configuration for Mirrored Applications in Cloud

Figure 7:
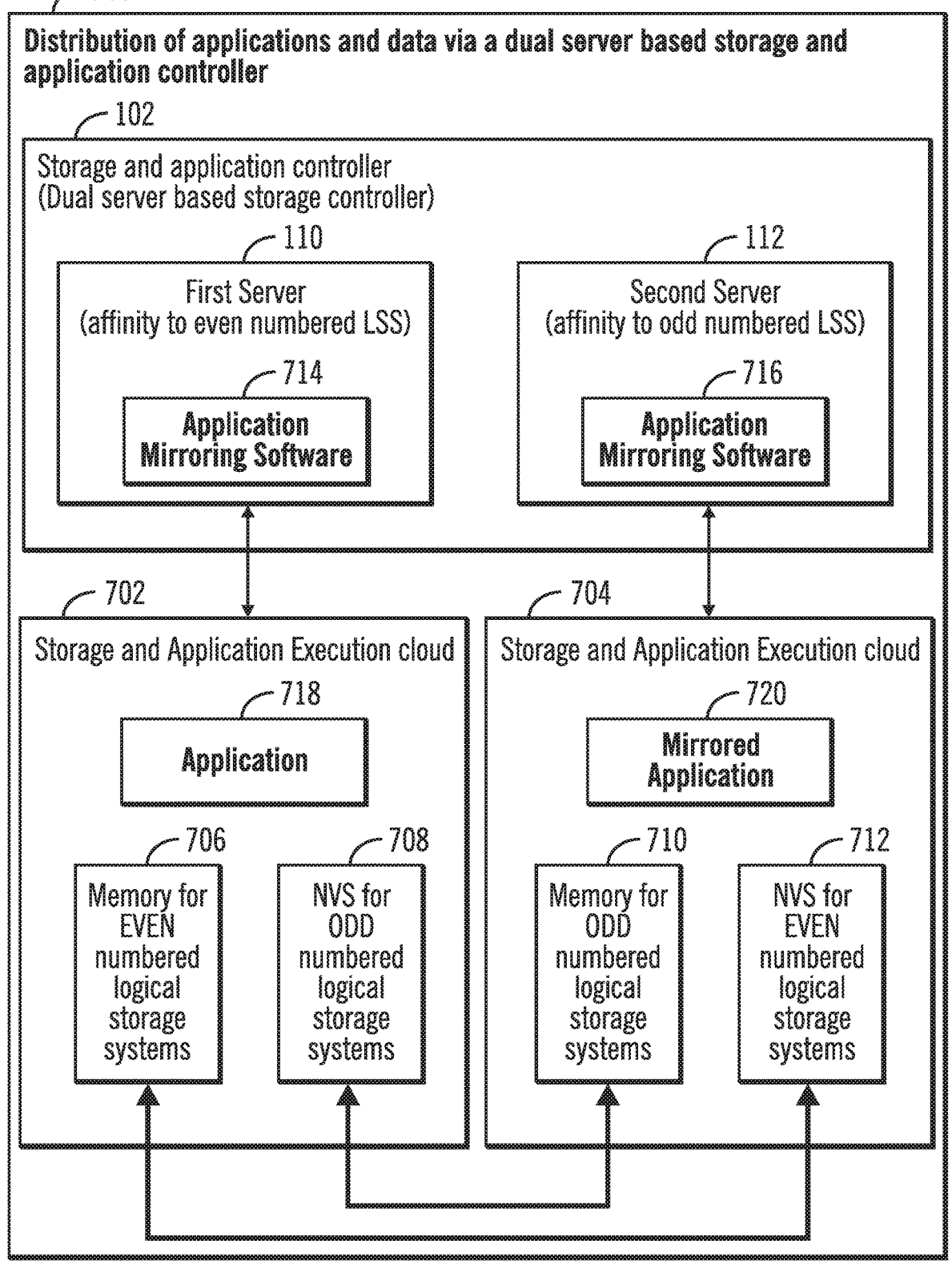
FIG. 7 illustrates a block diagram that shows the distribution of applications and data via a dual server based storage and application controller, in accordance with certain embodiments.

FIG. 7 illustrates a block diagram 700 that shows the distribution of applications and data via a dual server based storage and application controller 102, in storage and application execution clouds 702, 704 that are selected from a plurality of storage and application execution clouds based on security of communication links 506, security of storage and application clouds 502, and speed of access 506, via application mirroring software 714, 716 in storage servers 110, 112, in accordance with certain embodiments. While many different types of storage and application controllers may be used, FIG. 7 shows a particular type of storage and application controller in which the embodiments shown in FIGS. 1-6 may be implemented.

The storage and application controller 102 may provide virtualization capabilities for storage and simplify multiple storage systems into a single machine comprising dual servers 110, 112. The storage and application controller 102 allows hosts to address the storage via logical storage volumes maintained by the storage and application controller 102 in at least one or more cloud storages. The storage and application controller 102 tries to maintain two copies of the data while the data is moving through the storage and application controller 102 and the storage and application execution clouds coupled to the storage and application controller. When a write is issued to a logical storage volume and both the first server 110 and the second server 112 are operational, the write data is directed to the server that owns the logical storage volume. A logical storage volume may be a member of an even numbered logical subsystem (even numbered LSS) or an odd numbered logical subsystem (odd numbered LSS), where the storage and application controller 102 may manage storage in a plurality of logical subsystems (e.g., logical subsystems with identifying numbers ranging from 0 to 255).

In certain embodiments, the LSSs that have an even identifying number have an affinity with the first server 110, and LSSs that have an odd identifying number have an affinity with the second server 112. When a host issues a write to a logical volume, the storage and application controller 102 may direct that write to the server that owns (i.e., has affinity to) the LSS of which that logical volume is a member.

The block diagram 700 of FIG. 7 shows memory and non-volatile storage of the dual server based storage and application controller 102 being provided by two storage and application execution clouds 702, 704.

The first server 110 has affinity to even numbered logical subsystems (LSS), and the second server 112 has affinity to odd numbered LSS. The storage and application execution cloud 702 (selected from a plurality of storage and application execution clouds) assigned to the first server 110 based on security and responsiveness requirements provides memory 706 for the even numbered LSS to the first server 110, and provides non-volatile storage (NVS) 708 for the odd numbered LSS to the first server 110. The storage and application execution cloud 704 (selected from a plurality of storage and application execution clouds) provides memory 710 for the odd numbered LSS to the second server 112, and provides NVS 712 for even numbered LSS to the second server 112. The NVS 708 stores backup of data stored in memory 710, and the NVS 712 stores backup of data stored in memory 706.

Therefore, if the second server 112 is non-operational, then the operational first server 110 is able to perform the operations of the second server 112 by using the NVS 708 stored in the first storage and application execution cloud 202 assigned to the first server 110. The first server 110 of course keeps using the memory 706 provided by the first storage and application execution cloud 702 for operations directed at even numbered LSS, as the first server 110 has affinity to even numbered LSS. Furthermore, if the first server 110 is non-operational, then the operational second server 112 is able to perform the operations of the first server 110 by using the NVS 712 stored in the second storage and application execution cloud 204 assigned to the second server 112. The second server 112 of course keeps using the memory 710 provided by the second storage and application execution cloud 704 for operations directed at odd numbered LSS, as the second server 112 has affinity to odd numbered LSS.

In certain embodiment implemented in accordance with the mechanisms shown in FIGS. 1-6, the application mirroring software 714, 716 that execute in the first server 110 and the second server 112 respectively may be used to select the storage and application execution clouds 702, 704 out of a plurality of storage and application execution clouds for storing the application 718 and the mirrored application 720. The dual server configuration of the storage and application controller 102 provides protection for failure of a server of the dual servers 110, 112, and also allows applications to continue execution in case of a failure or compromise of a communication link to a storage and application execution cloud.

Further Cloud Computing Environments

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 8:
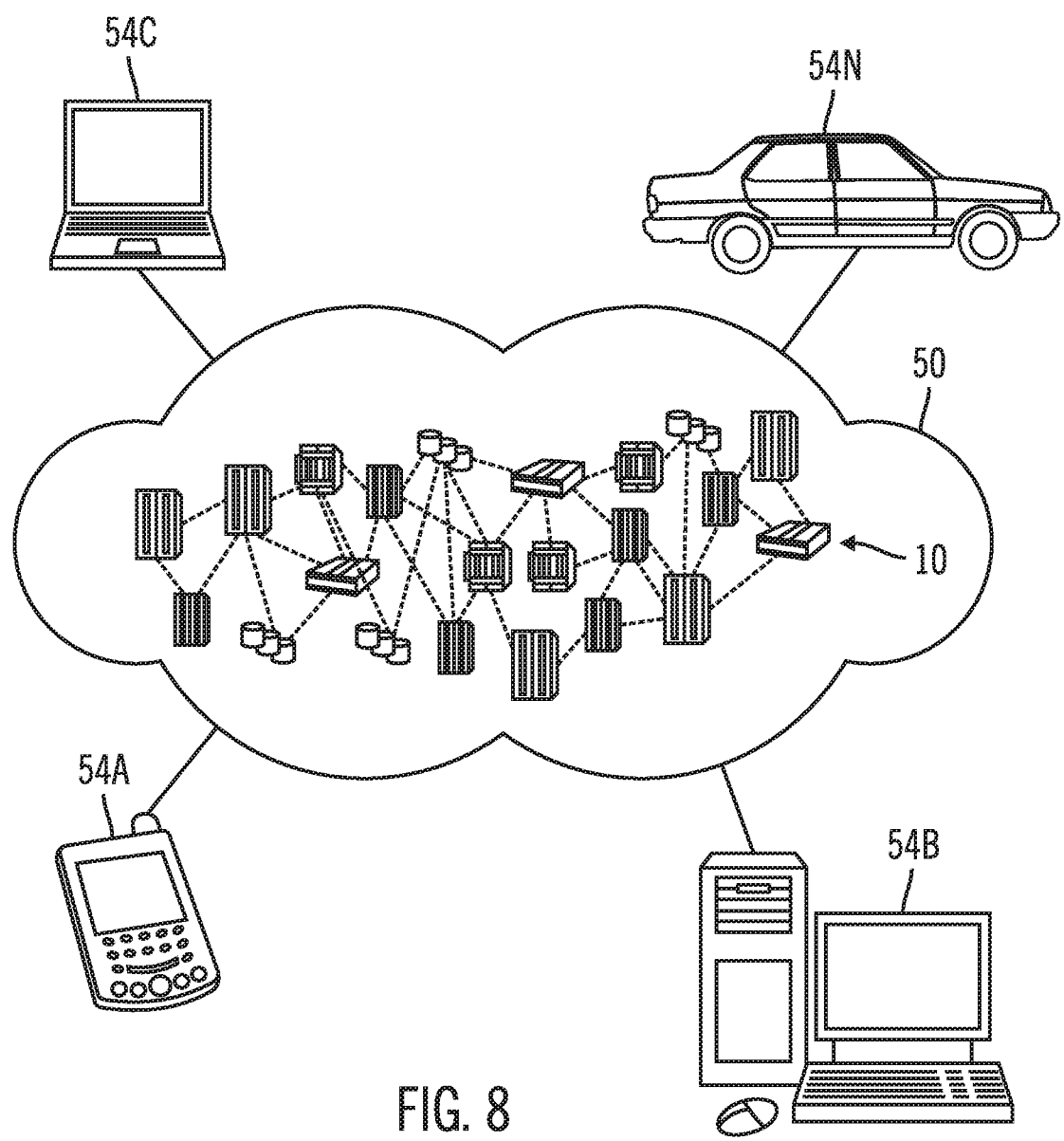
FIG. 8 illustrates a block diagram of a cloud computing environment, in accordance with certain embodiments.

Referring now to FIG. 8, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that cloud computing nodes 10 and cloud computing environment 50 can communicate with any type of computerized device over any type of network and/or network addressable connection (e.g., using a web browser).

Figure 9:
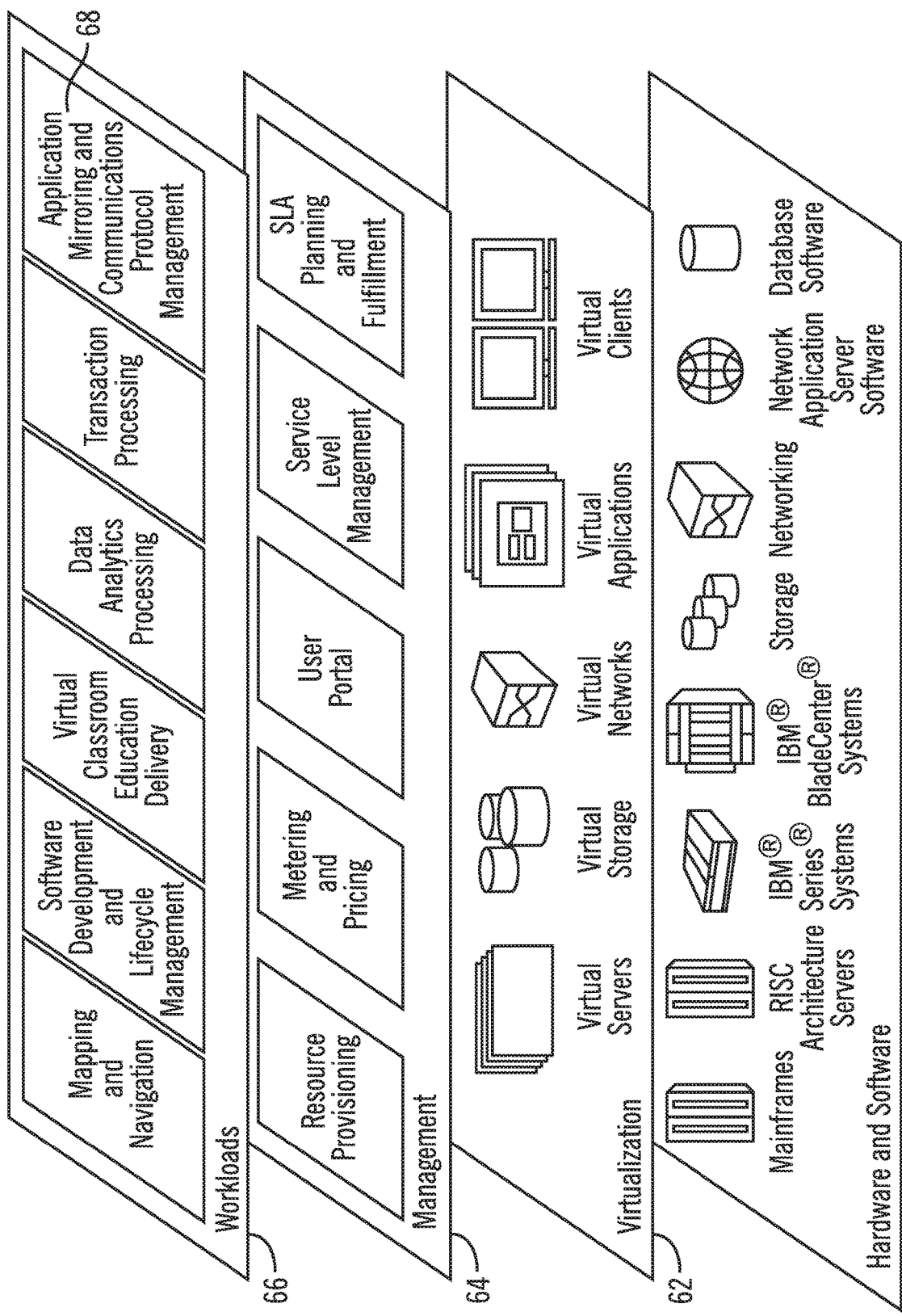
FIG. 9 illustrates a block diagram of further details of the cloud computing environment of FIG. 8, in accordance with certain embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the workload and functions provided by the application mirroring and communications protocol management for the dual server storage and application controller 102 (shown via reference numeral 68 in FIG. 9) as shown in FIGS. 1-9.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 10:
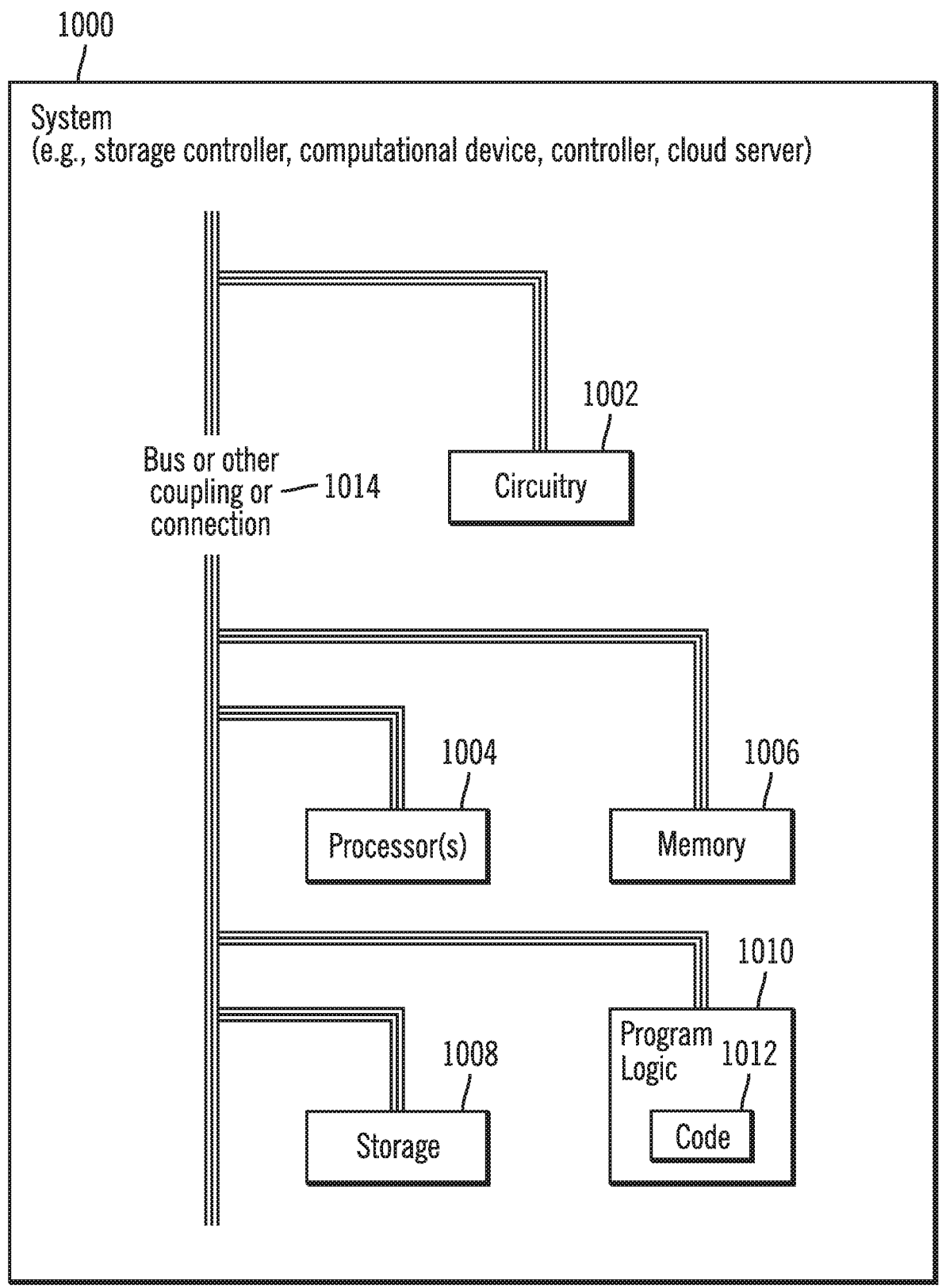
FIG. 10 illustrates a block diagram of a computational system that shows certain elements that may be included in the storage and application controllers including servers, in accordance with certain embodiments.

FIG. 10 illustrates a block diagram that shows certain elements that may be included in the storage and application controller 102, the servers 110, 112, the hosts 106, 108 or other computational devices such as those in storage and application execution clouds shown in FIGS. 1-9 in accordance with certain embodiments. The system 1000 may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM, ROM, PROM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. One or more of the components in the system 1000 may communicate via a bus or via other coupling or connection 1014. Therefore, while FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

The terms "an embodiment". "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    transmitting via a first communications protocol, an application to a first storage and application execution cloud;
    transmitting via a second communications protocol, a copy of the application to a second storage and application execution cloud; and
    in response to a compromise of the first communications protocol, stopping execution of the application and replacing the execution of the application via execution of the copy of the application.

2. The method of claim 1, wherein the first storage and application execution cloud is maintained by a first entity, and wherein the second storage and application execution cloud is maintained by a second entity, the method further comprising:
    in response to a failure in execution of the application in the first storage and application execution cloud, returning results to a host by executing the copy of the application in the second storage and application execution cloud.

3. The method of claim 2, the method further comprising:
    changing the first communications protocol to a different communications protocol after an elapse of a first predetermined amount of time, to transmit additional applications from a storage and application controller to the first storage and application execution cloud.

4. The method of claim 3, the method further comprising:
    changing the second communications protocol to a different communications protocol after an elapse of a second predetermined amount of time, to transmit copies of the additional applications from the storage and application controller to the second storage and application execution cloud.

5. The method of claim 2, the method further comprising:
in response to a compromise of the first or the second communications protocol, changing the compromised first or the second communications protocol to another communications protocol that is not compromised.

6. The method of claim 2, wherein determining which application to transmit and execute in which of a plurality of storage and application clouds is based on a plurality of factors including security features provided by the plurality of storage and application execution clouds, speed of access provided by the plurality of storage and application execution clouds, and communications protocols for communication with the plurality of storage and application execution clouds.

7. The method of claim 2, wherein a storage and application controller that is a dual server based controller is coupled to a plurality of hosts, wherein the first storage and application execution cloud is separated at least by 10 kilometers from the second storage and application execution cloud; and
the first communications protocol comprises a Virtual Private Network (VPN) tunnel, wherein the second communications protocol comprises an Internet direct connect, and wherein the first communications protocol is changed from the VPN tunnel to a Secure Sockets Layer (SSL) protocol, subsequent to an expiry of a period of time.

8. A system configurable to communicate with a first storage and application execution cloud and a second storage and application execution cloud, the system comprising:
a memory; and
a processor coupled to the memory, wherein the processor performs operations, the operations comprising:
transmitting via a first communications protocol, an application to the first storage and application execution cloud;
transmitting via a second communications protocol, a copy of the application to the second storage and application execution cloud; and
in response to a compromise of the first communications protocol, stopping execution of the application and replacing the execution of the application via execution of the copy of the application.

9. The system of claim 8, wherein the first storage and application execution cloud is maintained by a first entity, and wherein the second storage and application execution cloud is maintained by a second entity, the operations further comprising:
in response to a failure in execution of the application in the first storage and application execution cloud, returning results to a host by executing the copy of the application in the second storage and application execution cloud.

10. The system of claim 9, the operations further comprising:
changing the first communications protocol to a different communications protocol after an elapse of a first predetermined amount of time, to transmit additional applications from a storage and application controller to the first storage and application execution cloud.

11. The system of claim 10, the operations further comprising:
changing the second communications protocol to a different communications protocol after an elapse of a second predetermined amount of time, to transmit copies of the additional applications from the storage and application controller to the second storage and application execution cloud.

12. The system of claim 9, the operations further comprising:
in response to a compromise of the first or the second communications protocol, changing the compromised first or the second communications protocol to another communications protocol that is not compromised.

13. The system of claim 9, wherein determining which application to transmit and execute in which of a plurality of storage and application clouds is based on a plurality of factors including security features provided by the plurality of storage and application execution clouds, speed of access provided by the plurality of storage and application execution clouds, and communications protocols for communication with the plurality of storage and application execution clouds.

14. The system of claim 9, wherein:
the system is a dual server based controller that is coupled to a plurality of hosts, wherein the first storage and application execution cloud is separated at least by 10 kilometers from the second storage and application execution cloud; and
the first communications protocol comprises a Virtual Private Network (VPN) tunnel, wherein the second communications protocol comprises an Internet direct connect, and wherein the first communications protocol is changed from the VPN tunnel to a Secure Sockets Layer (SSL) protocol, subsequent to an expiry of a period of time.

15. A computer program product, the computer program product comprising a computer readable storage medium having computer readable program code embodied therewith, the computer readable program code configured to perform operations, the operations comprising:
transmitting via a first communications protocol, an application to a first storage and application execution cloud;
transmitting via a second communications protocol, a copy of the application to a second storage and application execution cloud; and
in response to a compromise of the first communications protocol, stopping execution of the application and replacing the execution of the application via execution of the copy of the application.

16. The computer program product of claim 15, wherein the first storage and application execution cloud is maintained by a first entity, and wherein the second storage and application execution cloud is maintained by a second entity, the operations further comprising:
in response to a failure in execution of the application in the first storage and application execution cloud, returning results to a host by executing the copy of the application in the second storage and application execution cloud.

17. The computer program product of claim 16, the operations further comprising:
changing the first communications protocol to a different communications protocol after an elapse of a first predetermined amount of time, to transmit additional applications from a storage and application controller to the first storage and application execution cloud.

18. The computer program product of claim 17, the operations further comprising:
changing the second communications protocol to a different communications protocol after an elapse of a second predetermined amount of time, to transmit copies of the additional applications from the storage and application controller to the second storage and application execution cloud.

19. The computer program product of claim 16, the operations further comprising:

in response to a compromise of the first or the second communications protocol, changing the compromised first or the second communications protocol to another communications protocol that is not compromised.

20. The computer program product of claim 16, wherein determining which application to transmit and execute in which of a plurality of storage and application clouds is based on a plurality of factors including security features provided by the plurality of storage and application execution clouds, speed of access provided by the plurality of storage and application execution clouds, and communications protocols for communication with a plurality of storage and application execution clouds.

* * * * *